Patented Mar. 29, 1949

2,465,704

UNITED STATES PATENT OFFICE 2,465,704

DEWATERING CORN FIBERS

Kurt I. L. Aspman, Chicago, and James William O'Brien, Flossmoor, Ill., assignors to American Maize-Products Company, a corporation of Maine No Drawing. Application February 1, 1945, Serial No. 575,738

3 Claims. (Cl. 100—48)

This invention relates to a method of dewatering fibers separated from corn in the wet milling process.

Heretofore it has been considered necessary to dewater the coarse and fine fibers separately. The process has been unsatisfactory, particularly in view of the very low handling charges necessary for the fibers that, after dewatering and drying, are sold as an ingredient of feed for livestock.

The present invention provides a process in which the coarse and the fine fibers are dewatered jointly in a continuous, economical and effective process involving a minimum of expense for machinery and labor of operation.

The fibers are separated from corn in a manner which is usual in the wet milling industry.

Corn is steeped in water containing sulfur dioxide, separated from the steep water, and cracked in a Foos or other convenient type of mill to free the germ. The germ is separated from the cracked corn by flotation in a starch slurry of selected density. The germ free material is passed through a Buhr mill to rub the starch from the fiber.

The product from the Buhr mill, consisting of a mixture of starch, fiber, and protein, is run over a coarse screen. This screen is generally in the form of a rotating screen or reel and is perforated at close intervals with holes of about ⅜ to 1¼ and usually ½ to 1 mm. diameter. This reel retains the coarse fibers and permits the remainder of the batch to pass through. Ordinarily about 70% of the total corn fibers are retained in the coarse fraction, this corresponding to approximately 3.5 pounds of the coarse fibers to the bushel of corn being processed.

The mixture passing through the coarse screen contains fine fibers and starch. This mixture is washed and then screened over silk fabric such as No. 12 to 20 in which the openings, between adjacent threads when dry, are approximately 0.0049 to 0.0029 inch each way. The fine fibers are retained on the silk; the starch passes through.

Conventionally the fine and the coarse fibers so obtained are separately washed by a countercurrent stream of fresh or of process water, recovered from some other operation of the wet milling industry, and then dried for cattle feed after appropriate addition of protein material.

This drying of the fine fibers separated as described above is extremely difficult. Even when dewatering is attempted by compression in batches, as in a plate and frame filter, the moisture content ordinarily cannot be reduced below 67%.

The coarse fiber is more easily dewatered, although it is not lowered with the ordinary continuous squeezers to a moisture content averaging less than 58% to 63% for different batches.

Briefly stated, the present invention comprises forming a mixture of the coarse and fine corn fibers, usually containing originally 75% to 90% of water, and subjecting the mixture to a gradually increasing pressure and finally to compaction at very high pressure, the water separated at various stages of the compaction being withdrawn continuously, so that the maximum pressure is applied only to the mass which has already been dewatered to a large extent. In the preferred embodiment the invention comprises the use in the mixture of coarse and fine fibers of the kind described in about equal proportions and at an initial moisture content of approximately 85% to 90%.

The temperature of this dewatering is suitably room temperature.

As the pressure is built up gradually to a very high final value as, for instance, at least 2,000 pounds to the square inch and suitably to 2,500 pounds or somewhat higher, the mixture of fine and coarse fibers is reduced to a moisture content below 60% and ordinarily between 50% and 55%.

The dewatering of the mixture of coarse and fine fibers may be done continuously in a conventional type of apparatus such as one consisting of a generally frusto-conically shaped, discontinuous flight, screw operating in a perforated cylinder with check devices at the feed and discharge ends, the screw having a hollow shaft and becoming larger in diameter and the space between it and the surrounding cylinder becoming, therefore, more narrow towards the said discharge end. The pitch of the flights is made rather low and the rate of revolution of the screw very slow, so as to give gradual building up of pressure from zero at the feed end to the very high compaction at the discharge end. A pulp press having these features and being suitable for use with the present method is described in Patent 1,354,528 issued to Wertenbruch on October 5, 1920.

The water squeezed out from the mass is withdrawn continuously along the length of the compacting device, through the perforations in the cylinder and preferably also in the wall of the hollow shaft of the screw, so that the maximum pressure is applied only to the previously partly dewatered and thus thickened material.

The fine fiber fraction alone cannot be dewatered in such a method. The fine fibers will not pack in the press.

When, however, the fine fibers and the coarse are mixed and are initially of moisture content not above 90%, then the fine fibers are dewatered as effectively as the coarse in the same mixture. This efficient dewatering of the mixture of fine and coarse fibers is due to a considerable extent to the fine fibers filling the voids between the coarse particles, thus permitting the formation of a compact mass with decreased free space for water to be held. Also, the coarse fibers act as a filter medium for the fine fibers; as a result the fine fibers are retained in the press, even though the perforations in the walls of the press are preferably about 6 mm. ($\frac{3}{16}$ inch) in diameter and are therefore much larger than the fine fiber particles themselves.

The amounts of fine and coarse fibers used in making the initial mixture are preferably about equal, although it is entirely satisfactory to use somewhat more coarse fibers than fine say 1 to 3 parts of the coarse fibers to 1 part of the fine fibers on the dry basis.

In a typical example of the method there was delivered to the compacting step a mixture of equal weights of coarse and fine fibers. The coarse fibers had been retained on a rotary screen having 3/4 mm. diameter perforations. These coarse fibers contained 82% of water, that is 82 parts by weight to 18 parts of dry fiber. The fine fibers had been passed through this coarse screen and retained on the No. 17 silk screen. They contained 92% of water. The whole mixture averaged 87% of water.

The mixture of the coarse and fine fibers was fed to a continuous compacter of the kind described. The moisture content of the material discharged from the delivery end of this compacter was 53%.

When, on the other hand, there was used a mixture of the coarse and fine fibers containing 91.2%, then an unsatisfactory reduction in the moisture content of the mixture was obtained; the product delivered from the compacter contained 65% of water.

The material dewatered as described may then be further dried in any usual manner, to moisture content suitable for storing and shipping as a cattle feed.

It will be understood that it is intended to cover all changes and modifications of the example of the invention herein chosen for the purpose of illustration which do not constitute departures from the spirit and scope of the invention.

What we claim is:

1. In dewatering the fine and coarse fiber separated from corn by wet milling, the method which comprises forming a mixture of the fine and coarse fibers containing a substantial proportion of fine fibers, containing coarse fibers in proportion at least approximately equal to that of the fine fibers, and having a moisture content between 75% and 90%, pressing and compacting the wet mixture against a perforated member and at a gradually increasing pressure to a final pressure equal at least to 2,000 pounds to the square inch, and withdrawing water separated from the fibers during all stages of the compacting, so that the maximum pressure is applied to the mixture only at the end of the dewatering process when the proportion of water present is the lowest, the fine fibers during this compaction decreasing the space available for water between the coarse fibers and the coarse fibers retaining the fine fibers.

2. The method described in claim 1, the said mixture including coarse fibers retained on a perforated screen of hole size 3/8 to 1 1/4 mm. diameter and fine fibers of size to pass through the said screen and be retained on a silk cloth of size of opening, between adjacent threads, of 0.0049 to 0.0029 inch each way, the proportion of coarse fiber being 1 to 3 times the proportion of fine fibers.

3. The method described in claim 1, the temperature of operation being room temperature and the compaction being continued until the water content is reduced below 60%.

KURT I. L. ASPMAN.
JAMES WILLIAM O'BRIEN.

REFERENCES CITED

The following references are of record in the file of this patent:

UNITED STATES PATENTS

| Number | Name | Date |
|---|---|---|
| 1,353,349 | Krafft | Sept. 21, 1920 |
| 1,354,528 | Wertenbruch | Oct. 5, 1920 |